(12) United States Patent
Andre

(10) Patent No.: US 10,518,689 B1
(45) Date of Patent: Dec. 31, 2019

(54) HOOK FOR TYING DOWN A LOAD ON THE DECK OF A TRANSPORT VEHICLE

(71) Applicant: LOHR INDUSTRIE, Hangenbieten (FR)

(72) Inventor: Jean-Luc Andre, Molsheim (FR)

(73) Assignee: LOHR INDUSTRIE, Hangenbieten (FR)

( * ) Notice: Subject to any disclaimer, the term of this patent is extended or adjusted under 35 U.S.C. 154(b) by 0 days.

(21) Appl. No.: 16/425,395

(22) Filed: May 29, 2019

(30) Foreign Application Priority Data

Jun. 29, 2018 (FR) ...................................... 18 55930

(51) Int. Cl.
*B60P 3/079* (2006.01)
*B60P 3/075* (2006.01)

(52) U.S. Cl.
CPC ............... *B60P 3/079* (2013.01); *B60P 3/075* (2013.01)

(58) Field of Classification Search
CPC .......... B60P 3/079; B60P 3/075; B60P 7/0807
USPC .......... 410/23, 7, 8, 9, 10, 11, 101; 248/499; 24/265 CD
See application file for complete search history.

(56) References Cited

U.S. PATENT DOCUMENTS

| | | | | |
|---|---|---|---|---|
| 2,322,576 A | * | 6/1943 | Huebshman | B66C 1/34 410/23 |
| 2,591,986 A | * | 4/1952 | Weiss | B60P 7/0807 410/23 |
| 3,338,186 A | * | 8/1967 | Herian | B61D 45/001 410/23 |
| 3,843,081 A | * | 10/1974 | Meier | B60P 7/0815 410/116 |
| 4,606,687 A | * | 8/1986 | Mantela | B60P 3/079 24/300 |
| 4,960,353 A | | 10/1990 | Thorndyke | |
| 6,527,487 B2 | * | 3/2003 | Adams | B60P 7/0807 410/104 |
| 7,871,228 B2 | | 1/2011 | Blanchet | |
| 8,393,838 B2 | * | 3/2013 | Plazek | B60P 7/0807 410/104 |
| 8,845,250 B1 | * | 9/2014 | Helms | B60P 7/0807 410/106 |

(Continued)

FOREIGN PATENT DOCUMENTS

AU 611700 B2 6/1991
EP 3238990 A1 11/2017

OTHER PUBLICATIONS

French Search Report issued in French Patent Application No. 1855930 dated Mar. 6, 2019.

*Primary Examiner* — Hilary L Gutman
(74) *Attorney, Agent, or Firm* — Marshall, Gerstein & Borun LLP (57) ABSTRACT

The tie-down hook includes a curved hooking finger whereof the free end, intended to be inserted in oblong through orifices provided in the deck of a transport vehicle, includes a flattened spatula extending laterally on each side by a lateral extension. It also includes an elongated intermediate part with a round or oval section, and a connecting part that is preferably annular whereof the orifice is delimited in its inner part by rounded edges. The upper surface of the spatula that is oriented facing toward the connecting part is rounded in relief when considered in profile. The tie-down hook preferably includes a conventional second curved hooking finger provided opposite the other finger so as to form an S.

15 Claims, 6 Drawing Sheets

(56) References Cited

U.S. PATENT DOCUMENTS

2010/0068000 A1\* 3/2010 Russell ................ B60P 7/0807
                                                    410/106
2018/0154818 A1\* 6/2018 Sauerwald ............ B60P 7/0807

\* cited by examiner

HOOK FOR TYING DOWN A LOAD ON THE DECK OF A TRANSPORT VEHICLE

TECHNICAL FIELD

The present disclosure relates to a hook for anchoring a load on the deck of a transport vehicle using a strap.

The disclosure more particularly relates to a tie-down hook including a curved hooking finger, the free end of which is intended to be inserted into through orifices provided in the deck of the transport vehicle and a connecting part, typically annular, intended to receive the strap, or more preferably, a connecting member fastened to the strap, the curved hooking finger and the connecting part being connected by an intermediate part.

BACKGROUND

In particular in the field of the transport of vehicles on the deck of a railway car or an auto carrier, it is known to use tie-down systems to immobilize the wheels of the vehicles on said deck. Of course, very similar tie-down systems can also be provided to immobilize any type of load on a deck.

These tie-down systems generally comprise a strap connected to tie-down hooks. A tie-down hook is generally provided at one end of the strap, while the other end is engaged with a tensioning device, for example a strap tensioner with ratchet or a dedicated device provided on the deck of the transport vehicle. The strap is typically passed over a wheel of a vehicle to be immobilized, then tensioned so as to press the wheel downward on the deck. A tie-down hook is generally provided in front of and behind the wheel to be immobilized so as to connect the strap locally to the deck. More specifically, the strap is typically connected to an end hook; it slides in another tie-down hook situated between the wheel and the strap tensioner. Seen from above, the tie-down hooks are aligned optimally in the axis of the wheel. However, since the tensioner can be located below the body of the car, it is generally offset toward the outside. This results in lateral forces primarily at the sliding hook that tend to tilt it outward.

With the aim of allowing a strap to be fastened on the deck, the deck of railway cars or auto carriers has oblong through orifices extending longitudinally in the axis of the transport vehicle. The curved end of the tie-down hooks is then inserted into these through orifices in order to catch at their front or rear border. When the strap is tensioned, the free end of the hooks presses against the deck, bearing on the underside thereof.

With the increased weights of cars, the tension present in the tie-down systems must be increased. As a result, the traditional hooks tend to damage the deck of the transport vehicles. It has in fact been observed that the free end of the tie-down hooks had a tendency to deform the material on the underside of the plates, sometimes leading to the breaking of the decking of the decks, and thus to poor restraint of the vehicle.

This problem should therefore be resolved, preferably without having to modify the deck of the transport vehicles.

Known from documents EP 3238990 A1, U.S. Pat. Nos. 4,960,353 A and 7,871,228 B2 is a tie-down hook including a cylindrical and rectilinear spatula. Due to its rectilinear shape having a curve in a single plane, the spatula does not allow a slight pivoting of the lateral extensions relative to the deck when they are pressed against the underside thereof. Thus, the spatula may damage the underside of the deck when the strap is urged laterally.

Known from document AU 611700 B2 is a tie-down hook that is not intended to be inserted into through orifices provided in the deck, but into loops attached on said deck. At its free end, this hook includes a round part with angular edges that could damage the underside of the deck when it is pressed against the underside of the deck.

SUMMARY OF THE DISCLOSURE

Having noted that during the tensioning of the straps, the prior tie-down hooks create an excessive stress concentration for the material, the subject matter of the present disclosure therefore aims to overcome the drawbacks of the prior art by proposing a new type of hook that does not damage the deck of transport vehicles, even in case of strong tensioning of the strap.

The subject matter of the present disclosure is achieved owing to a tie-down hook for tying down a load on the deck of a transport vehicle by means of a strap, said hook including a curved hooking finger, a free end of which is intended to be inserted into through orifices provided in the deck of the transport vehicle, and a connecting part having an orifice intended to receive the strap or a connecting member fastened to the strap, the curved hooking finger and the connecting part being connected by an intermediate part, characterized in that:
- the intermediate part is elongated and its portions intended to come into contact with the through orifices of the deck are rounded;
- the curved hooking finger includes a curved part whereof the portions intended to come into contact with the through orifices are rounded;
- at its free end, the curved hooking finger includes a spatula, said spatula having a flattened shape and laterally extending from each side by a lateral extension, the upper surface of the spatula that is oriented facing toward the connecting part being rounded in relief when considered in profile; and
- the curved hooking finger, the intermediate part and the spatula are configured in a single piece of metal.

Since it can be formed in a single piece of metal, at least for its curved hooking finger, its intermediate part and its spatula, the hook is very strong and can be produced at a lower cost.

The intermediate part creates a distance between the curved hooking finger and the connecting part so as to allow the hook to pivot freely when it is engaged in one of the through orifices of the deck. It also makes it possible to position bearing in a flat zone situated between the through orifices provided in the deck.

The shape of the curved part of the curved hooking finger that connects the spatula to the intermediate part is studied so that bearing always happens in this flat zone even if the hook is inclined. This curved part makes it possible to position the spatula in "spherical" contact below the deck, with free hook angles. This curved part has rounded bearing surfaces so as not to damage the rim of the through orifices of the deck.

The rounded shape of the portions of the intermediate part intended to come into contact with the through orifices in particular makes it possible not to damage the rim of the through orifices of the deck when the hook pivots around a substantially vertical axis. When the hook is inclined, there is a force with a direction parallel to the deck. This force is taken-up by the bearing of the intermediate part on the stamping of the through orifices provided in the deck of the transport vehicle.

Due to their orientation, their length and their shape, the lateral extensions advantageously make it possible to distribute the stresses over a greater length, in particular the Hertz pressures, exerted by the spatula against the underside of the deck so as not to damage said deck.

By the rounded upper part of the lateral extensions, one advantageously guarantees that the hook is still in contact against the underside of the deck by the lateral extensions, irrespective of the longitudinal inclination angle of the hook relative to said deck.

According to one example embodiment, the connecting part has an annular shape and has a central orifice with a generally circular shape in order in particular to allow a free rotation of the stirrup or the strap inserted into this orifice.

Figure 1:
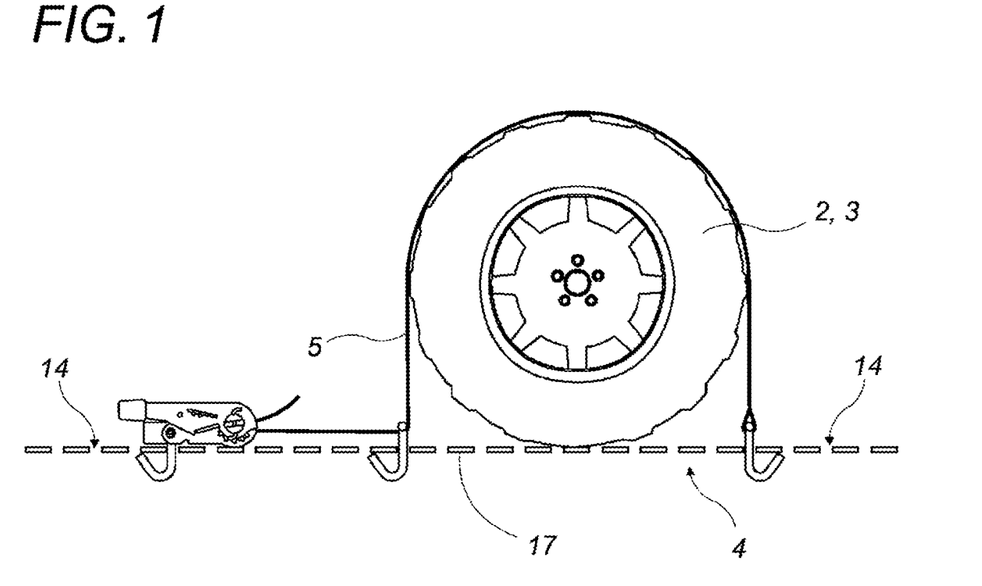
FIG. 1 is a profile view illustrating the immobilization of a wheel on the deck of a transport vehicle by a tie-down system comprising hooks according to the prior art.
Figure 2:
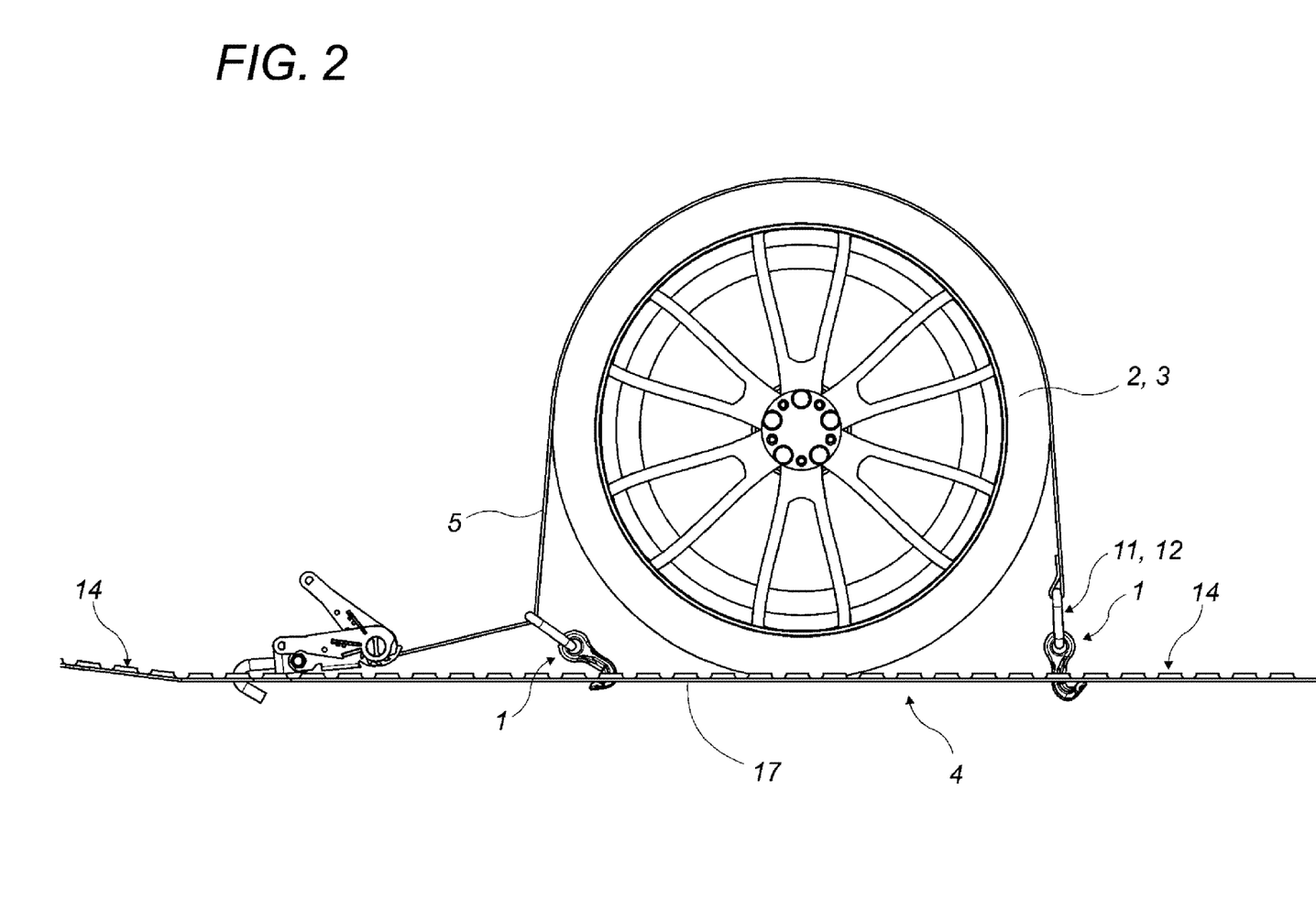
FIG. 2 is a profile view illustrating the immobilization of a wheel on the deck of a transport vehicle by a tie-down system comprising hooks.
Figure 3:
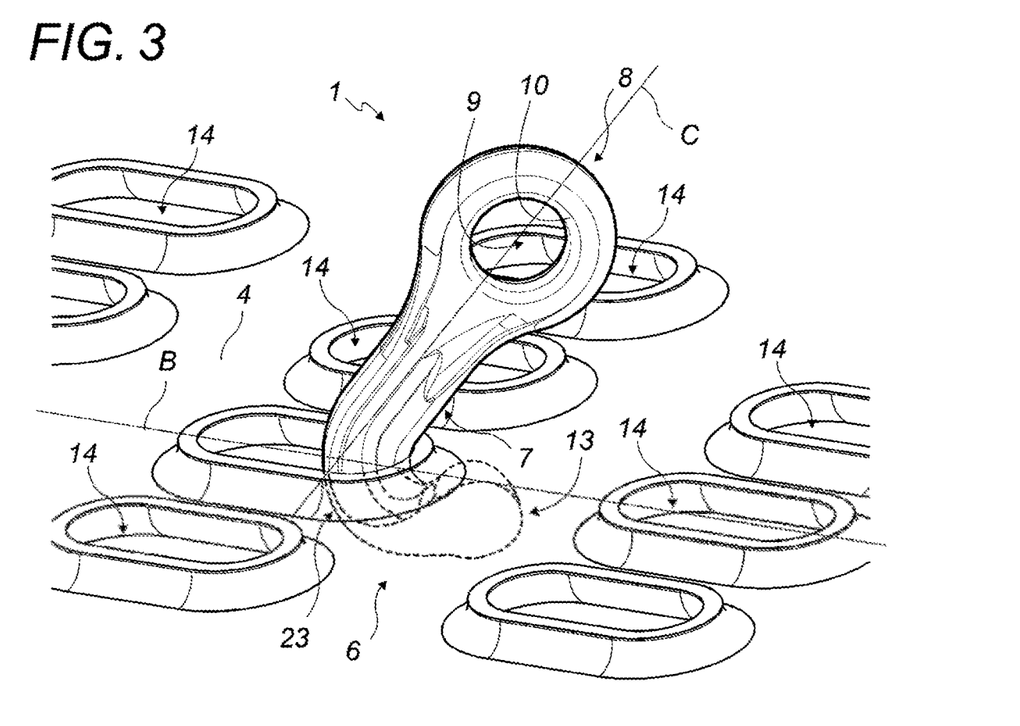
FIG. 3 is a perspective view illustrating the housing of a hook in one of the oblong through orifices of the deck of a transport vehicle.

This orifice can also have a general oval shape, which allows a slight travel of said stirrup or said strap in the central orifice. The stirrup makes it possible to loop the strap correctly and produce a seam. Since there can be several strap widths, several stirrup models can advantageously be provided for a single hook. This variant of the hook including a stirrup allows an additional freedom in the orientation of the strap, which lets the hook position itself in the through orifices of the deck. The stirrup is particularly advantageous for passing the strap when the hook is used for the return as shown in FIG. 2 between the wheel and the ratchet device for tensioning the strap.

According to another example embodiment, the axis in which the lateral extensions extend is orthogonal to the plane in which the connecting part extends. Likewise, according to another example embodiment, the axis of the lateral extensions is orthogonal to the intermediate part. Thus, the hook is preferably symmetrical relative to the plane in which the connecting part extends such that the lateral extensions come into contact against the underside of the deck over their entire length when the hook is moved vertically upward.

According to an additional example embodiment, the upper face of the spatula that is oriented facing toward the connecting part is a convex bulging contact surface. The fact that the contact surface is slightly bulging advantageously allows a slight pivoting of the lateral extensions relative to the deck when they are in contact against the underside thereof.

According to one example embodiment, the curved hooking finger and the connecting part are situated in a same plane. Indeed, as previously mentioned, the hook is preferably symmetrical relative to the plane in which the connecting part extends.

According to another example embodiment, the free end of each lateral extension is convex bulging. Thus, the spatula only has rounded parts, or even convex bulging parts, such that irrespective of the orientation thereof when it is bearing against the underside of the deck, no projecting angular part can damage the deck by generating excessive stress concentrations, even when the hook comes into contact against the deck by the free end of one of its lateral extensions.

According to an additional example embodiment, the curved hooking finger has no projecting angular part. Thus, as previously mentioned, irrespective of the orientation of the hook when it is bearing against the underside of the deck, no projecting angular part can damage the deck.

According to an example embodiment, the connecting part is equipped with a strap fastening stirrup, and:
either the connecting part is configured in a stirrup;
or the stirrup is a separate piece from the connecting part that is mounted rotating in the orifice of the connecting part.

According to another example embodiment, the stirrup is mounted rotating in the orifice of the connecting part according to three rotation degrees of freedom. Owing to this stirrup and its swivel-type assembly with the hook, the strap provided to be guided by the stirrup can orient itself freely and adapt to the configuration necessary for tying down a load, or a wheel, on a deck. This swiveling also makes it possible to provide additional degrees of freedom to absorb the strapping variations.

According to an additional example embodiment, the lower surface of the spatula that is oriented away from the connecting part is a substantially flat surface, although very slightly convex bulging. Thus, despite its preferably slightly convex bulging configuration in its upper part, the spatula is thin enough to be able to be inserted into the through orifices of the deck, while remaining very robust to withstand the mechanical forces experienced by the hook.

According to one example embodiment, the connecting part is toroidal. Thus, the rounded edges of the orifice of the connecting part allow a free orientation of the stirrup or the strap that is inserted therein, without having a risk of deterioration of said strap by abrasion on protruding parts and the connecting part does not have an angular protrusion to the outside that could damage the deck.

According to another example embodiment, the hook includes a second curved hooking finger, the free end of which is not flattened or laterally widened. Thus, including both a curved hooking finger according to the present disclosure and a traditional curved hooking finger, the hook allows the user to choose to fasten his hook traditionally or in the new manner depending on the configuration of the load presented to the user. In the case where a through orifice of the deck does not allow the penetration of the curved hooking finger, for example due to a deformation thereof, the user can then cause the traditional curved hooking finger, which is narrower, to penetrate therein. Thus, the double hook has a particularly advantageous versatile nature. The double hook is also useful to secure loads on a deck in a zone thereof not including oblong through orifices, but simple circular through orifices, for example of the simple hole type in a thick metal sheet or on a vertical sheet edge.

According to an additional embodiment, the second curved hooking finger is provided opposite the other curved hooking finger relative to the connecting part such that the tie-down hook forms an S.

According to an example embodiment, the tie-down hook is forged from steel, which advantageously allows it to be produced at a reduced cost.

According to another example embodiment, the intermediate part has a substantially round or oval general section, such that, irrespective of the orientation of the intermediate part when the hook is engaged in a through orifice provided in the deck of the transport vehicle, the intermediate part cannot damage the edges of said through orifice.

The advantages of the presently described embodiments are particularly numerous. The hook according to the present description makes it possible to prevent its free end from digging into the material on the underside of the decks through a burring phenomenon of the material, without having to make the slightest change to the current decks.

Its configuration allows it multiple orientations relative to the deck, and none of these orientations can damage said deck. The swiveling of a stirrup further offers a great freedom of movement and orientation for the strap connected to the hook.

The specific shape of the hook, and in particular near the spatula, procures other advantages.

Owing to the lateral extensions that are positioned transversely relative to the oblong orifices of the deck, the hook cannot easily disengage from said orifices. To disengage the hook, it is necessary to completely release the tension of the strap and even to relax it completely, and next to remove the hook from the orifice where it is housed by pivoting it around itself. Thus, in case of temporary loss of tension, the hook will never be able to leave the orifice.

Likewise, the tie-down is independent of the orientation of the hook in the orifice of the deck.

The oblong orifices of the deck can be oriented in the longitudinal direction of the deck or can be perpendicular.

BRIEF DESCRIPTION OF THE DRAWINGS

Other characteristics and advantages of the presently described embodiments will be seen more clearly from the following description, provided with reference to the appended drawings, provided by way of non-limiting examples, in which.

DETAILED DESCRIPTION

The structurally and functionally identical elements shown in several different figures are assigned the same numerical or alphanumerical reference.

The tie-down hook (1) is intended to tie down a load (2), for example the wheel (3) of a vehicle, on the deck (4) of a transport vehicle using a strap (5).

It includes a curved hooking finger (6), an intermediate part (7) and a connecting part (8).

The connecting part (8) is preferably annular and has an orifice (9), preferably delimited in its inner part by rounded edges (10), and intended to receive the strap (5) or, more preferably, a connecting member (11) fastened to the strap (5), for example a stirrup (12). The connecting part (8) is preferably toroidal.

Stirrup (12) refers to any piece of the tie-down hook (1) that is provided to return the strap (5) connected to the hook (1) and to allow the easy sliding of the strap (5) relative to the hook (1). Different variants of stirrup (12) are illustrated as examples in FIGS. 8, 14, 15 and 16. As illustrated in FIG. 15, the connecting part (8) can take any other form, since it is typically not in contact with the deck (4) and is therefore not able to damage it by the presence of projecting sharp edges.

The intermediate part (7) connects the curved hooking finger (6) to the connecting part (8). It is elongated, preferably rectilinear, and extends along an axis C. The portions of the intermediate part (7) that are intended to come into contact with the through orifices (14) of the deck (4) are rounded. The intermediate part (7) preferably has a substantially round or oval general section.

The curved hooking finger (6) includes a curved part (23) whereof the portions intended to come into contact with the through orifices are rounded. Since this curved part (23) could come into contact with the edge of the through orifices (14) of the deck (4), these surfaces are also rounded.

The free end of the curved hooking finger (6) is intended to be inserted into through orifices (14), typically oblong, provided in the deck (4) of the transport vehicle.

This free end includes a spatula (13), which is a flattened part that extends laterally on each side by a lateral extension (15).

Due to its flattened shape, the spatula (13) has a small thickness that advantageously allows it to be inserted in the through orifices (14) of the deck (4), despite the overthickness imparted by the convex bulging upper surface (16) of the spatula (13) (see later).

The radius of the curved part (23) of the curved hooking finger (6) is designed to guarantee the contact of the spatula (13) below the deck (4) for all of the angles that the tie-down hook (1) can assume.

When the tie-down hook (1) is considered with its connecting part (8) on top and its curved hooking finger (6) on bottom (see for example FIG. 7), the upper surface (16) of the spatula (13) has a rounded profile. This upper surface (16) is oriented facing the connecting part (8). This is the part of the curved hooking finger (6) that is intended to come into contact against the underside (17) of the deck (4).

According to a preferred embodiment, the upper surface (16) of the spatula (13) is convex bulging. Thus, not only does the spatula (13) have a rounded profile when considered in profile in the plane X-Y (see FIGS. 4 and 7), but it also has a rounded profile when considered in profile in another plane, preferably in the plane Y-Z (see FIGS. 4 and 6). Thus, the upper surface (16) of the spatula (13) is a combination, preferably orthogonal, of two positive curves. Thus, the upper surface (16) of the spatula (13) has a substantially spherical cap shape, which clearly distinguishes the spatula (13) of the present disclosure from simple cylindrical spatulas, whereof the upper surface has no more than a single rounded profile.

Such a combination of two positive curves procures a convex bulging contact surface (16) that advantageously allows a slight pivoting of the lateral extensions (15) relative to the deck (4) when they are in contact against the underside (17) thereof. This pivoting advantageously allows a slight orientation of the tie-down hook (1), even when it is pressed against the underside (17) of the deck (4), which procures a slight possibility of orientation of the strap (5) and in particular avoids damaging the underside (17) of the deck (4).

An orthogonal combination of two positive curves advantageously makes it possible to have a symmetrical tie-down hook (1), but the two positive curves can also be combined according to other angles and non-orthogonally.

As appears in FIGS. 10 to 13, the rounded part of the upper surface (16) of the spatula (13) makes it possible to guarantee that the tie-down hook (1) is always in contact against the underside (17) of the deck (4) by the lateral extensions (15), irrespective of the longitudinal inclination angle of the tie-down hook (1) relative to said deck (4).

Figure 10:
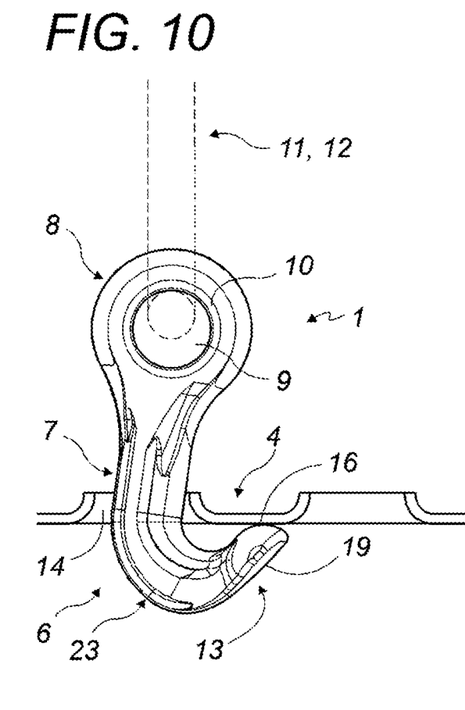
FIGS. 10 to 13 are profile views of a hook equipped with a stirrup and housed in one of the oblong through orifices of the deck of a transport vehicle, these figures illustrating several orientation angles of the hook.
Figure 11:
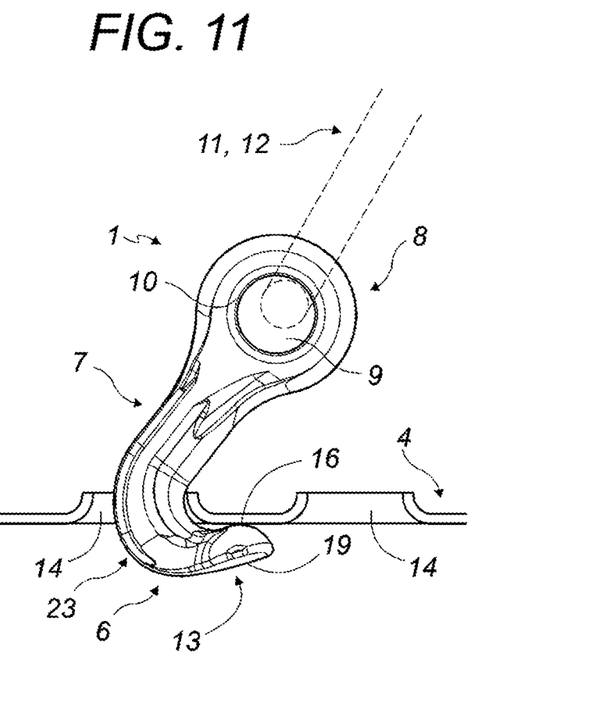
Figures 12, 13:
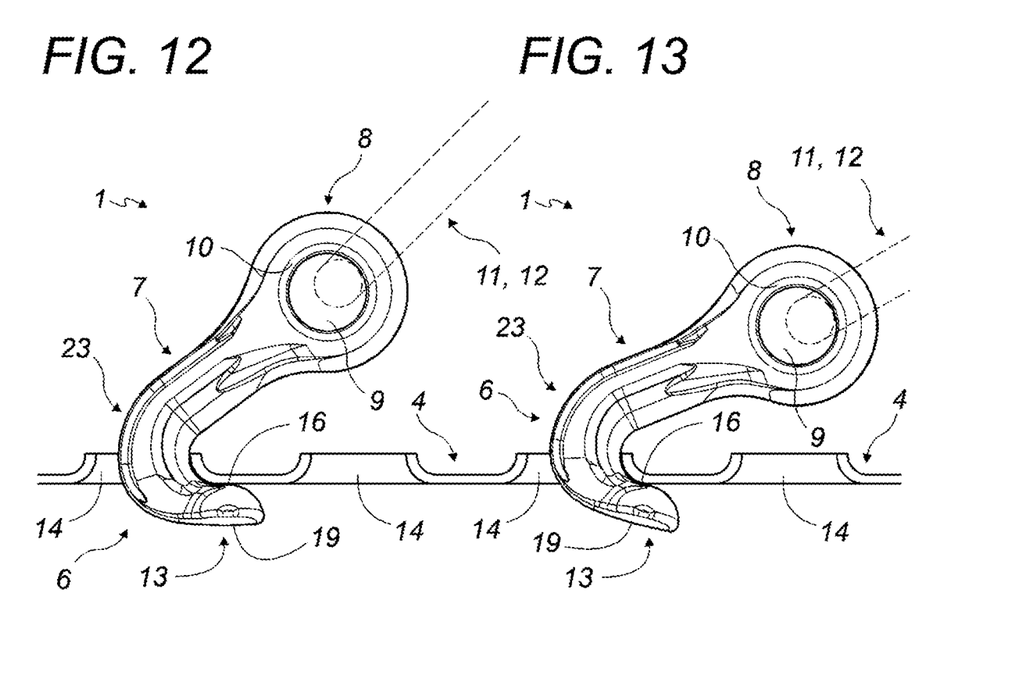

In order to illustrate this advantage, FIG. 10 shows a tie-down hook (1) shown in the position bearing against the underside (17) of the deck (4) when it undergoes a pulling force oriented upward along an angle of 90° relative to the horizontal plane of said deck (4). In FIG. 11, this angle is 60°, whereas it is 45° in FIG. 12 and 30° in FIG. 13.

In these figures, irrespective of the inclination angle of the tie-down hook (1) in a longitudinal vertical plane, it will be noted that it is still bearing against the underside (17) of the deck (4) by its lateral extensions (15). Longitudinal vertical plane refers to any plane parallel to the plane X-Y shown in FIGS. 4, 5 and 7.

The convex bulging shape of the spatula (13) allows a slight pivoting of the tie-down hook (1) along any horizontal axis in addition to the transverse axis allowed by the spatula (13).

The axis (A) along which the lateral extensions (15) extend is orthogonal to the intermediate part (7), such that the spatula (13) of the tie-down hook (1) adopts the general shape of a fishtail rounded on the top.

Figure 4:
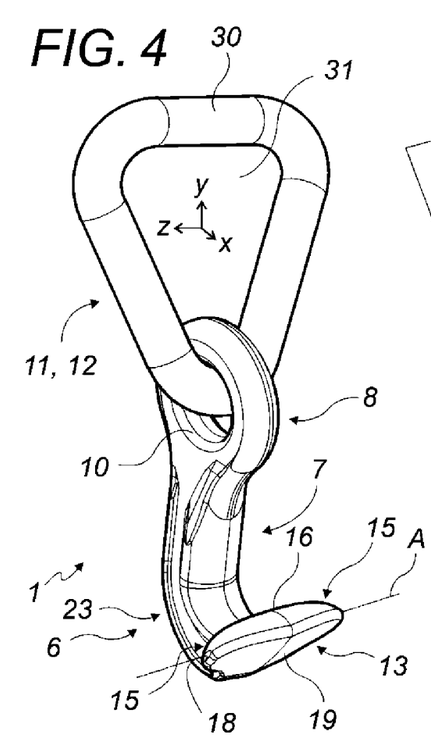
FIG. 4 is a front perspective view of a hook equipped with a stirrup.
Figure 5:
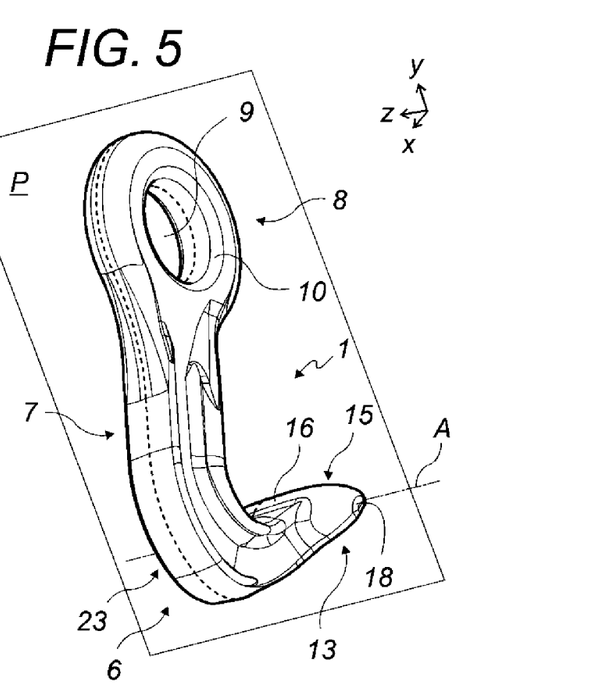
FIG. 5 is a back perspective view of a hook.
Figure 7:
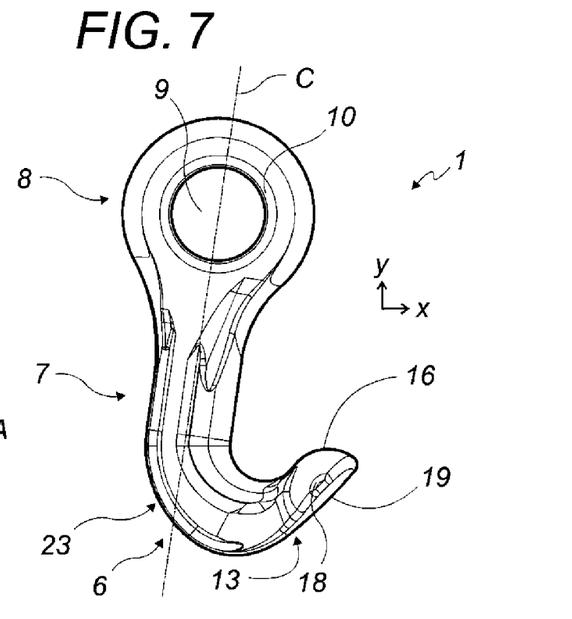
FIG. 7 is a profile view of a hook.

The axis (A) along which the lateral extensions (15) extend is orthogonal to the plane in which the connecting part (8) extends, i.e., orthogonal to the plane X-Y shown in FIGS. 4, 5 and 7.

When the tie-down hook (1) is considered with its connecting part (8) on top and its curved hooking finger (6) on bottom (see for example FIG. 10), the axis (A) in which the lateral extensions (15) extend is a horizontal axis that is orthogonal to the longitudinal direction (B) in which the oblong through orifices (14) provided in the deck (4) of the transport vehicle extend.

In reference to FIGS. 4 to 7, the axis (A) in which the lateral extensions (15) extend is parallel to the axis Z shown in these figures, while the longitudinal direction (B) in which the oblong through orifices (14) extend is generally parallel to the axis X shown in these figures.

Figure 6:
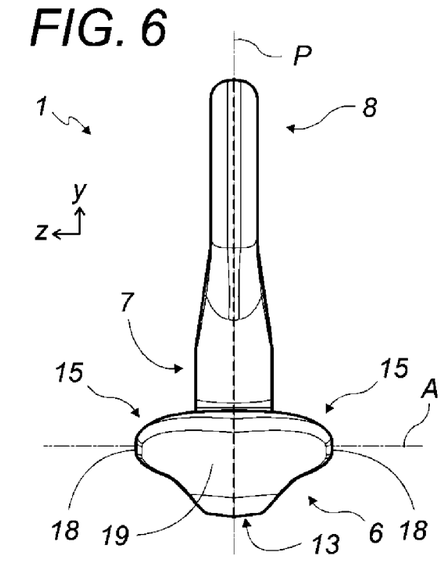
FIG. 6 is a front view of a hook.

When considered positioned like in FIG. 7, the tie-down hook (1) preferably has a vertical plane of symmetry passing through the plane (P) in which the connecting part (8) extends. This plane (P) is shown in FIGS. 5 and 6, with its contact zone with the tie-down hook (1) being shown in broken lines. In reference to FIGS. 4 to 7, the plane (P) is parallel to the plane XY shown in these figures.

Thus, the curved hooking finger (6) and the connecting part (8) are situated in a same general plane, and the lateral extensions (15) extend along an axis (A) orthogonal to this plane.

The free end (18) of each of the lateral extensions (15) is convex bulging, and more generally, the curved hooking finger (6) does not have any projecting angular part, capable of damaging any surface against which it may come into contact.

Thus, owing to the roundings, during tensioning of the strap (5) to which the tie-down hook (1) is connected, the spatula (16) bears under the deck (4) without creating stress concentration.

Absence of angular parts means that the curved hooking finger (6) does not have any sharp edges or pointy parts. Convex means which has a protruding curve, which is rounded outwards.

When the connecting part (8) is annular, its orifice (9) preferably has a circular or oval general shape.

According to one preferred embodiment shown in FIG. 4, the connecting part (8) of the tie-down hook (1) is equipped with a stirrup (12) for fastening a strap (5).

Figures 8, 9:
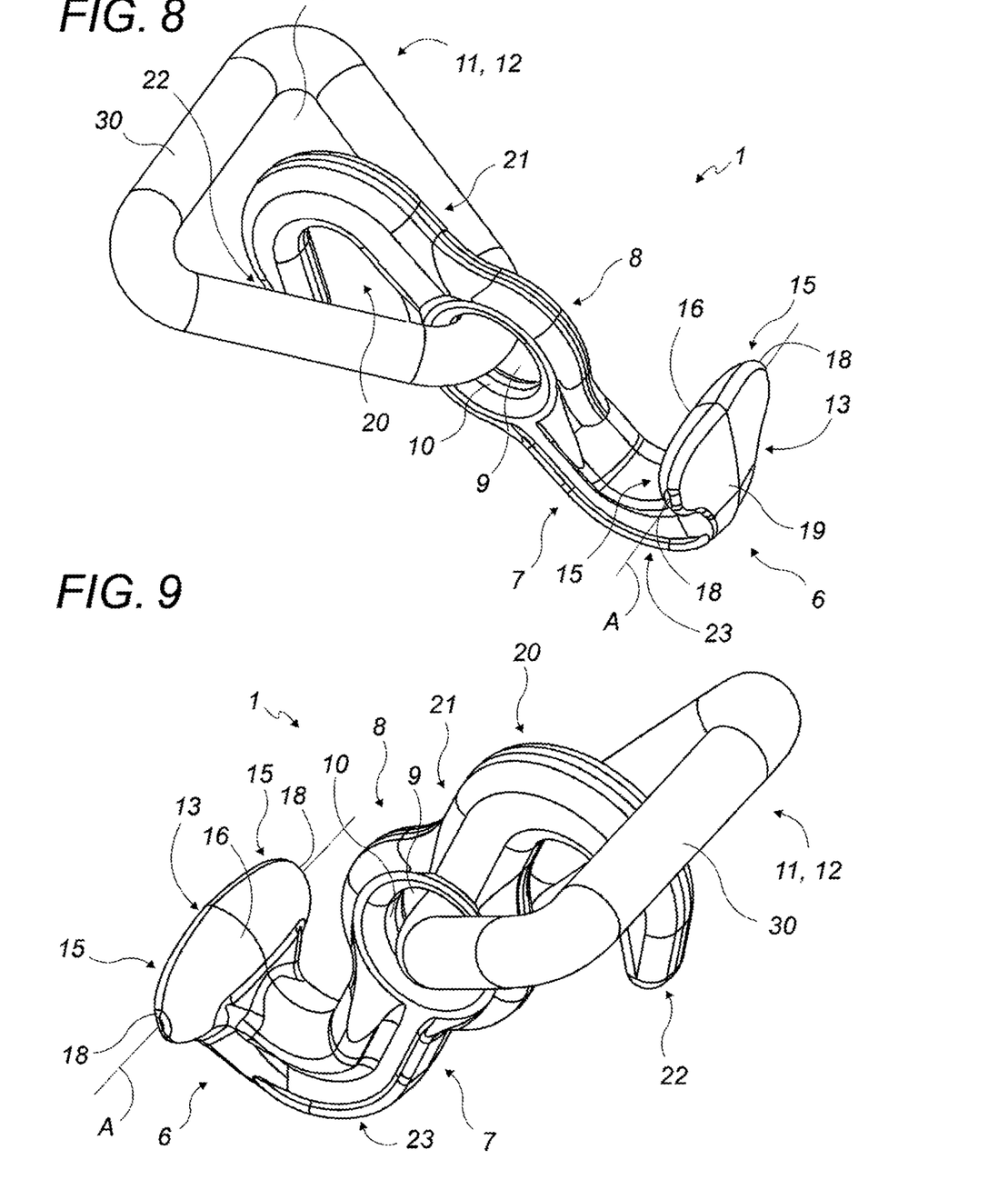
FIGS. 8 and 9 are perspective views of a hook according to an embodiment called "double hook" and equipped with a stirrup.

As illustrated in FIGS. 4 and 8, the stirrup (12) can be mounted rotating in the orifice (9) of the connecting part (8), preferably with three rotation degrees of freedom when the connecting part (8) is toroidal. The swiveling of the stirrup (12) leaves the rotations along z and x free. Thus, if the strap (5) is not perfectly aligned with the tie-down hook (1), these rotation freedoms allow the curved hooking finger (6) to bear under the deck (4) without being stressed.

As illustrated in FIG. 15, the connecting part (8) can also be configured in a stirrup (12). According to this variant, the connecting part (8) configured in a stirrup (12) can be in a single piece with the rest of the tie-down hook (1), or can be mounted pivoting on the intermediate part (7).

In this figure, the stirrup (12) comprises a curved piece (26) substantially in the shape of a U, and a rod (27) provided to fasten the strap (5) and fastened between the two arms of the U of the curved piece (26). This rod (27) is preferably mounted rotating between the two arms of the U of the curved piece (26).

As illustrated in FIG. 15, the stirrup (12) can be mounted pivoting on the intermediate part (7) around the longitudinal axis C of said intermediate part (7). In this case, the curved part (26) can have a through orifice through which the intermediate part (7) is inserted, the free end thereof then including a widened part (29) preventing the removal of the intermediate part (7) from said through orifice.

Generally, the stirrup (12) is made from a bar with a circular section which is sintered and welded after insertion into the connecting part (8). The strap (5) is next sewn on the stirrup (12). These parts (5, 8, 12) are therefore usually inseparable.

Figure 14:
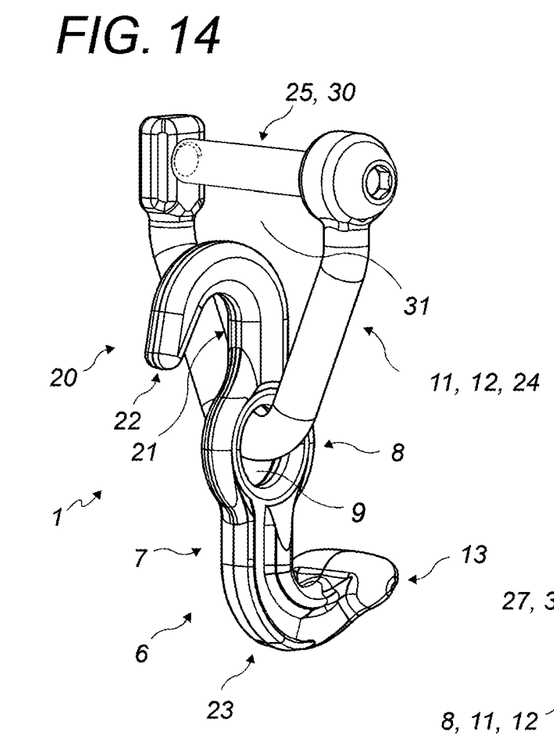
FIG. 14 is a perspective view illustrating a "double hook" in which the stirrup is in the form of a clevis rotatably housed in the orifice of the connecting part.
Figure 15:
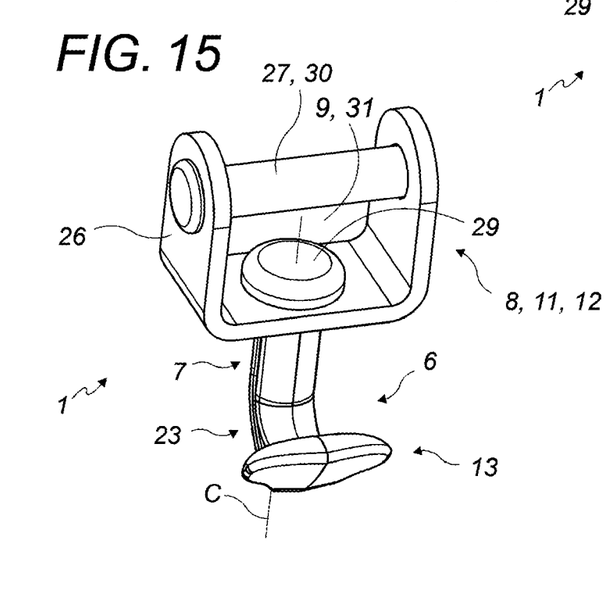
FIG. 15 is a perspective view illustrating a hook in which the connecting part is configured in a stirrup.

It is, however, possible to consider a variant as illustrated in FIG. 14, in which the stirrup (12) is in the form of a sort of clevis (24) able to be opened and closed by a screw (25). According to this variant, the strap (5) (not shown in FIG. 14) ends with a loop sewn in advance and provided to be mounted on the screw of the stirrup (12). Thus, according to this variant, the tie-down hook (1) includes a stirrup (12) in the form of a clevis (24) passed through by a screw (25), and a strap (5), all being able to be assembled separately. The stirrup (12) in clevis form (24) is configured to allow its passage in the central orifice (9) of the connecting part (8) of the tie-down hook (1).

The lower surface (19) of the spatula (13) of the curved hooking finger (6) that is oriented away from the connecting part (8) is preferably a substantially flat surface, although very slightly convex bulging.

According to one preferred variant shown in FIGS. 8, 9, 14 and 16, the tie-down hook (1) includes a second curved hooking finger (20).

This second curved hooking finger (20) is preferably provided opposite the other curved hooking finger (6) relative to the connecting part (8) such that the tie-down hook (1) forms an S. It can also be provided differently, for example at a right angle relative to the other curved hooking finger (6).

The second curved hooking finger (20) and the connecting part (8) are connected by a second elongated intermediate part (21), preferably rectilinear and with a substantially round or oval general section.

This second curved hooking finger (20) has a conventional shape, although preferably without any projecting angular part. Thus, the free end (22) of the second curved hooking finger (20) is not flattened, or laterally widened.

Figure 16:
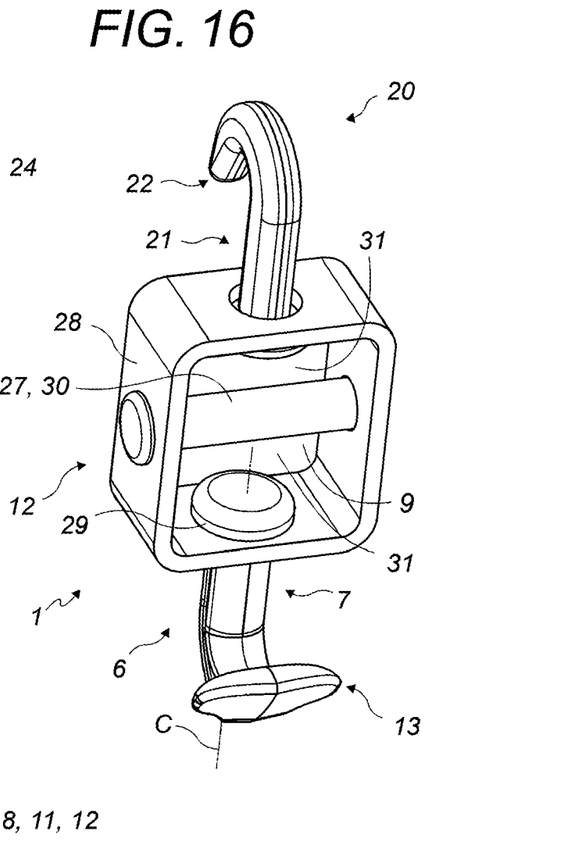
FIG. 16 is a perspective view illustrating a "double hook" in which the connecting part is configured in a stirrup.

As illustrated in FIG. 16, the two curved hooking fingers (6 and 20) can be mounted pivoting on the intermediate part (7).

In this FIG. 16, the connecting part (8) is configured in a stirrup (12). It comprises a loop (28) in which a rod (27) is mounted, preferably rotating, intended for the fastening of the strap (5). In this figure, the loop (28) has a substantially square general shape, but it can have any other shape, for example annular. In this FIG. 16, the intermediate part (7), the curved hooking finger (6) and the spatula (13) are similar to those of FIG. 15.

In the tie-down hook (1), the curved hooking finger (6), an intermediate part (7) and the spatula (13) are configured in a single piece of metal.

In the case where the connecting part (8) and the curved hooking finger (6) are not provided pivoting relative to one another, the connecting part (8) can also be in a single piece with the rest of the hook (1). Thus, in this case, the entire hook (1) is in a single piece of metal.

The tie-down hook (1) and its component parts are preferably forged from steel.

The stirrup (12) generally comprises a transverse piece (30) with a rounded section around which the strap (5) can slide freely. This transverse piece (30) is provided at a distance from the rest of the tie-down hook (1) such that a free space (31) exists between said transverse piece (30) and the other parts of the tie-down hook (1) that allows this free sliding.

In the case where the stirrup (12) is in the form of a clevis (24), the transverse piece (30) around which the strap (5) slides can be formed by the screw (25) of said clevis (24).

In the case where the connecting part (8) is configured in a stirrup (12) and where it comprises a substantially U-shaped curved piece (26) and a rod (27), the transverse piece (30) around which the strap (5) slides can be formed by said rod (27).

It is obvious that this description is not limited to the examples explicitly described, but also includes other embodiments and/or implementations. Thus, a technical characteristic described herein can be replaced by an equivalent technical characteristic without going beyond the scope of the present invention as defined in the attached claims.

The invention claimed is:

1. A tie-down hook for tying down a load on a deck of a transport vehicle by means of a strap, said tie-down hook including a curved hooking finger, the free end of which is intended to be inserted into through orifices provided in the deck of the transport vehicle and including a connecting part having an orifice intended to receive the strap or a connecting member fastened to the strap, the curved hooking finger and the connecting part being connected by an intermediate part, wherein:

the intermediate part is elongated and the portions thereof which are intended to come into contact with the through orifices of the deck are rounded;

the curved hooking finger includes a curved part whereof the portions intended to come into contact with the through orifices are rounded;

the curved hooking finger includes, at a free end thereof, a spatula, said spatula having a flattened shape and laterally extending from each side by a lateral extension, a upper surface of the spatula that is oriented facing toward the connecting part and is intended, during use, to come into contact against the underside of the deck, being rounded in relief when considered in profile and being a convex bulging contact surface, such that the upper surface of the spatula is an orthogonal combination of two positive curves; and the curved hooking finger, the intermediate part and the spatula are configured in a single piece of metal.

2. The tie-down hook according to claim 1, wherein the connecting part is annular shaped and wherein the orifice is central and has a generally circular or oval shape.

3. The tie-down hook according to claim 1 wherein an axis in which the lateral extensions extend is orthogonal to a plane in which the connecting part extends.

4. The tie-down hook according to claim 1, wherein an axis of the lateral extensions is orthogonal to the intermediate part.

5. The tie-down hook according to claim 1, wherein the curved hooking finger and the connecting part are situated in a same plane.

6. The tie-down hook according to claim 1, wherein each lateral extension has a free end which is convex bulging.

7. The tie-down hook according to claim 1, wherein the curved hooking finger does not have any projecting angular part.

8. The tie-down hook according to claim 1, wherein the connecting part is equipped with a stirrup for fastening the strap, and wherein:

either the connecting part is configured in a stirrup;

or the stirrup is a separate piece from the connecting part that is mounted rotating in the orifice the connecting part.

9. The tie-down hook according to claim 8, wherein the stirrup is mounted rotating in the orifice of the connecting part according to three rotation degrees of freedom.

10. The tie-down hook according to claim 1, wherein a lower surface of the spatula that is oriented away from the connecting part is a substantially flat surface.

11. The tie-down hook according to claim 2, wherein the connecting part is toroidal.

12. The tie-down hook according to claim 1, wherein the tie-down hook includes a second curved hooking finger with a free end that is not flattened, or laterally widened, the second curved hooking finger and the connecting part being connected by an elongated second intermediate part.

13. The tie-down hook according to claim 12, wherein the second curved hooking finger is provided opposite the other curved hooking finger relative to the connecting part such that the tie-down hook forms an S.

14. The tie-down hook according to claim 1, wherein the tie-down hook is forged from steel.

15. The tie-down hook according to claim 1, wherein the intermediate part has a substantially round or oval general section.

* * * * *